(12) United States Patent
Fujishiro

(10) Patent No.: US 10,165,532 B2
(45) Date of Patent: Dec. 25, 2018

(54) MOBILE COMMUNICATION SYSTEM, RADIO BASE STATION, AND MOBILE COMMUNICATION METHOD

(71) Applicant: KYOCERA CORPORATION, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 661 days.

(21) Appl. No.: 14/385,873

(22) PCT Filed: Mar. 15, 2013

(86) PCT No.: PCT/JP2013/057362
§ 371 (c)(1),
(2) Date: Sep. 17, 2014

(87) PCT Pub. No.: WO2013/141148
PCT Pub. Date: Sep. 26, 2013

(65) Prior Publication Data
US 2015/0103819 A1    Apr. 16, 2015

Related U.S. Application Data

(60) Provisional application No. 61/612,546, filed on Mar. 19, 2012.

(51) Int. Cl.
*H04W 56/00* (2009.01)
*H04W 36/00* (2009.01)
(Continued)

(52) U.S. Cl.
CPC ... *H04W 56/0015* (2013.01); *H04W 36/0066* (2013.01); *H04W 56/001* (2013.01); *H04W 36/08* (2013.01); *H04W 92/20* (2013.01)

(58) Field of Classification Search
CPC . H04W 56/0015; H04W 36/0066; H04J 3/00; H04B 7/216
See application file for complete search history.

(56) References Cited

U.S. PATENT DOCUMENTS 8,184,611 B2    5/2012 Tiedemann, Jr. et al.
9,247,513 B2    1/2016 Dick et al.
(Continued)

FOREIGN PATENT DOCUMENTS

JP    2000-333234 A    11/2000
JP    2001-517892 A    10/2001
(Continued)

OTHER PUBLICATIONS

The extended European search report issued by the European Patent Office dated Oct. 29, 2015, which corresponds to European Patent Application No. 13765201.2-1855 and is related to U.S. Appl. No. 14/385,873.

(Continued)

*Primary Examiner* — Wei Zhao
(74) *Attorney, Agent, or Firm* — Studebaker & Brackett PC

(57) ABSTRACT

A mobile communication system includes a plurality of radio base stations (410) communicating with an UE (10). Each of the plurality of radio base stations (410) comprises an interface (415) that notifies another radio base station (410) of synchronization information through a backhaul network, the synchronization information designating a synchronization state between the radio base station (410) and the UE (10).

3 Claims, 15 Drawing Sheets

(51) Int. Cl.
*H04W 36/08* (2009.01)
*H04W 92/20* (2009.01)

(56) References Cited

U.S. PATENT DOCUMENTS

| | | | | |
|---|---|---|---|---|
| 2004/0057396 | A1* | 3/2004 | Hokao | H04B 1/712 370/320 |
| 2005/0085265 | A1* | 4/2005 | Laroia | H04W 36/0072 455/560 |
| 2005/0250498 | A1* | 11/2005 | Lim | H04W 36/26 455/436 |
| 2010/0260168 | A1 | 10/2010 | Gheorghiu et al. | |
| 2011/0235599 | A1* | 9/2011 | Nam | H04L 1/0027 370/329 |
| 2014/0044108 | A1* | 2/2014 | Earnshaw | G01S 5/0063 370/336 |

FOREIGN PATENT DOCUMENTS

| | | |
|---|---|---|
| JP | 2009-239568 A | 10/2009 |
| JP | 2010-004247 A | 1/2010 |
| JP | 2010-252355 A | 11/2010 |
| JP | 2011-087126 A | 4/2011 |
| JP | 2011-244486 A | 12/2011 |
| WO | 2008/133567 A1 | 11/2008 |
| WO | 2010/118261 A2 | 10/2010 |
| WO | 2011/063047 A1 | 5/2011 |
| WO | 2011/137561 A1 | 11/2011 |

OTHER PUBLICATIONS

An Office Action; "Notice of Reasons for Rejection," issued by the Japanese Patent Office dated Apr. 5, 2016, which rresponds to Japanese Patent Application No. 2016-003906 and is related to U.S. Appl. No. 14/385,873; with English language statement of relevance.

International Search Report; PCT/JP2013/057362; dated May 14, 2013.

3GPP TR 36.819 V11.1.0 (Dec. 2011); 3rd Generation Partnership Project; Technical Specification Group Radio Access Network; Coordinated multi-point operation for LTE physical layer aspects (Release 11).

LG ELECTRONICS; "Methods to facilitate the inter-cell coordination in heterogeneous networks"; 3GPP TSG-RAN WG1 #62b R1-105358; Oct. 11, 2010.

* cited by examiner

FIG. 6

| INFORMATION NAME | TYPE | VALUE | REMARK |
|---|---|---|---|
| SYNC METHOD | ENUM | GPS,IEEE1588,..., NONE | SYNCHRONIZATION METHOD OF ABSOLUTE TIME |
| SUB-FRAME TIME OFFSET | INTEGER | | CORRECTION VALUE OF ABSOLUTE TIME REFERENCE POINT AND SUBFRAME REFERENCE POINT |
| SUB-FRAME NO.OFFSET | INTEGER | | CORRECTION VALUE OF ABSOLUTE TIME REFERENCE POINT AND SUBFRAME NUMBER REFERENCE POINT |
| TIMING ADVANCE OFFSET | INTEGER | | TA;TIMING ADVANCE |

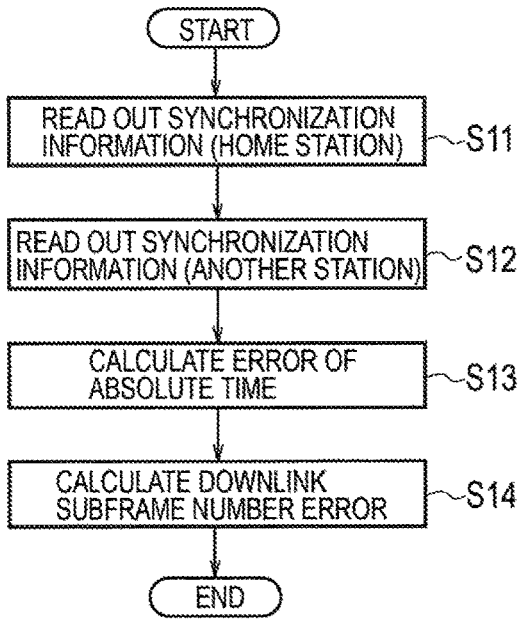
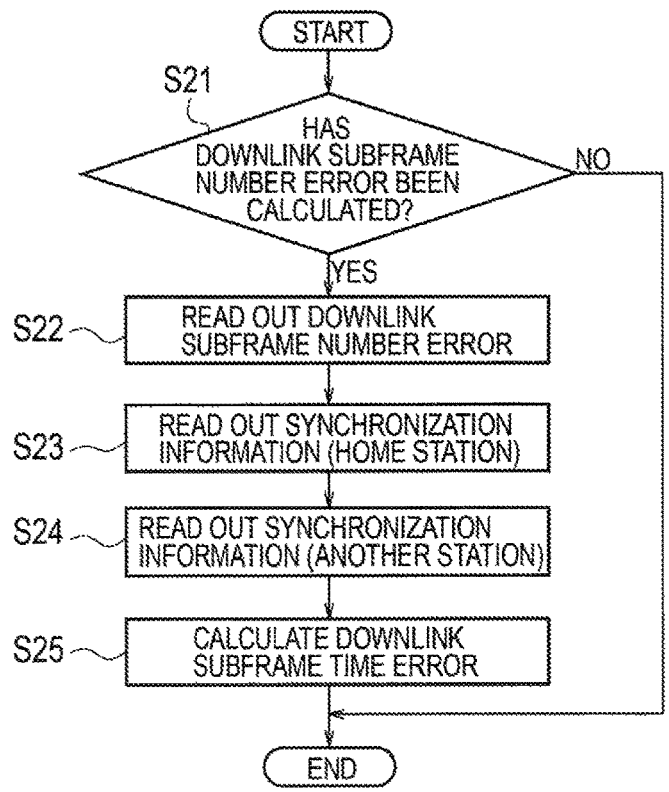

FIG. 13

| INFORMATION NAME | TYPE | VALUE | REMARK |
|---|---|---|---|
| DL TIMING OFFSET | INTEGER | | DOWNLINK TIMING ERROR |

FIG. 16

| INFORMATION NAME | TYPE | VALUE | REMARK |
|---|---|---|---|
| HO SYNCHRONIZATION DISABLE | BOOLEAN | TRUE/FALSE | OMIT SYNCHRONIZATION PROCESS (TRUE) |
| SOFT HANDOVER ENABLE | BOOLEAN | TRUE/FALSE | ALLOW SOFT HANDOVER PROCESS (TRUE) |

FIG. 17

| INFORMATION NAME | TYPE | VALUE | REMARK |
|---|---|---|---|
| DL TIMING OFFSET THRESHOLD | INTEGER | | ALLOWED VALUE OF DL TIMING ERROR |
| UL TIMING OFFSET THRESHOLD | INTEGER | | ALLOWED VALUE OF UL TIMING ERROR |
| CoMP HO CRITERION | BOOLEAN | TRUE/FALSE | WHETHER CoMP SHO IS ALLOWED |

MOBILE COMMUNICATION SYSTEM, RADIO BASE STATION, AND MOBILE COMMUNICATION METHOD

TECHNICAL FIELD

The present invention relates to a mobile communication system including a plurality of radio base stations, the radio base station, and a mobile communication method used in the mobile communication system.

BACKGROUND ART

Conventionally, there has been known a mobile communication system including a plurality of radio base stations. For example, as such a mobile communication system, LTE (Long Term Evolution) has been known.

Furthermore, as a process cooperatively performed by the plurality of radio base stations, a handover, a cooperative reception process, a cooperative transmission process and the like are considered. The cooperative reception process and the cooperative transmission process are called CoMP (Coordinated Multi-Point Operation) and the like.

As described above, in the process cooperatively performed by the plurality of radio base stations, it is necessary to achieve synchronization between each of the plurality of radio base stations and a radio terminal. In this regard, in the process cooperatively performed by the plurality of radio base stations, a procedure for achieving the synchronization between each of the plurality of radio base stations and the radio terminal is defined.

However, a case in which synchronization was already achieved among the plurality of radio base stations is also assumed. In such a case, the procedure for achieving the synchronization between each of the plurality of radio base stations and the radio terminal is redundant.

PRIOR ART DOCUMENT

Non-Patent Document

Non-patent Document 1: 3GPP TR36.819 V11.1.0 (Dec. 22, 2011)

SUMMARY OF INVENTION

A mobile communication system according to a first feature is a system, which includes a plurality of radio base stations communicating with a radio terminal. Each of the plurality of radio base stations comprises a notification unit that notifies another radio base station of synchronization information through a backhaul network, the synchronization information designating a synchronization state between the radio base station and the radio terminal.

In the first feature, when performing a handover procedure from a first radio base station synchronized with the radio terminal to a second radio base station not synchronized with the radio terminal, the radio terminal omits a synchronization process between the radio terminal and the second radio base station.

In the first feature, in the handover procedure, the first radio base station notifies the radio terminal of an identifier indicating whether it is possible for the first radio base station and the second radio base station to cooperatively receive an uplink signal and to cooperatively transmit a downlink signal.

In the first feature, a handover procedure from a first radio base station synchronized with the radio terminal to a second radio base station not synchronized with the radio terminal is performed. The first radio base station comprises a control unit that determines whether it is possible to omit a synchronization process between the radio terminal and the second radio base station, on the basis of the synchronization information.

In the first feature, each of the plurality of radio base stations comprises a control unit that determines whether it is possible for two or more radio base stations to cooperatively receive an uplink signal, on the basis of the synchronization information.

In the first feature, each of the plurality of radio base stations comprises a control unit that determines whether it is possible for two or more radio base stations to cooperatively transmit a downlink signal, on the basis of the synchronization information.

In the first feature, the synchronization information includes at least one of information indicating a difference between a timing at which the radio terminal transmits an uplink signal and a timing at which the radio base station receives the uplink signal, information indicating an difference between timings at which the radio terminal receives downlink signals from the plurality of radio base stations, information indicating a difference between a reference point on an absolute time axis common in the plurality of radio base stations and a reference point on a unique time axis unique to the radio base station, and a procedure for achieving synchronization between the radio base station and the radio terminal.

A radio base station according to a second feature is a radio base station, which communicates with a radio terminal. The radio base station comprises a notification unit that notifies another radio base station of synchronization information through a backhaul network, the synchronization information designating a synchronization state with the radio terminal.

A mobile communication method according to a third feature is a method, which is used in a mobile communication system including a plurality of radio base stations communicating with a radio terminal. The mobile communication method comprises a step of notifying, by each of the plurality of radio base stations, another radio base station of synchronization information through a backhaul network, the synchronization information designating a synchronization state between the radio base station and the radio terminal.

BRIEF DESCRIPTION OF DRAWINGS

FIG. 6 is a block diagram illustrating the synchronization information according to the first embodiment.

FIG. 7 is a flow diagram illustrating the operation of the mobile communication system 100 according to the first embodiment.

FIG. 8 is a flow diagram illustrating the operation of the mobile communication system 100 according to the first embodiment.

FIG. 13 is a diagram illustrating a message format of the synchronization information according to the first modification.

FIG. 16 is a diagram illustrating an example of a message format of the identifier according to the second modification.

FIG. 17 is a diagram illustrating an example of a message format of the criteria of determination according to the second modification.

DESCRIPTION OF EMBODIMENTS

Figure 1:
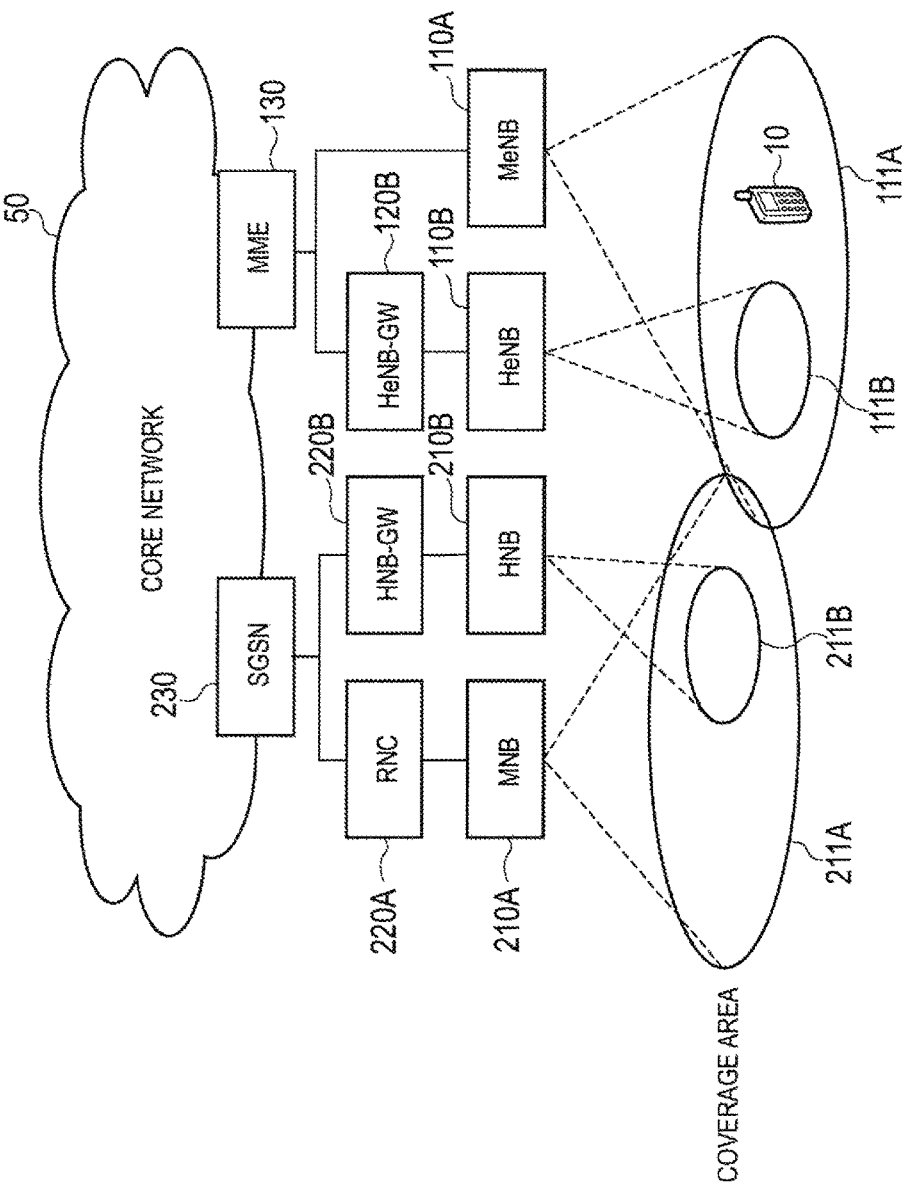
FIG. 1 is a diagram illustrating a mobile communication system 100 according to the first embodiment.

Hereinafter, a description will be given of the mobile communication system according to the embodiments of the present invention, with reference to the drawings. Note that the same or similar reference signs are applied to the same or similar portions in the drawings.

It will be appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

SUMMARY OF THE EMBODIMENT

The mobile communication system according to the embodiment is a system, which includes a plurality of radio base stations communicating with a radio terminal. Each of the plurality of radio base stations comprises a notification unit that notifies another radio base station of synchronization information through a backhaul network, the synchronization information designating a synchronization state between the radio base station and the radio terminal.

In the embodiment, the plurality of radio base stations share the synchronization information by notifying one another of the synchronization information through the backhaul network. Consequently, it is possible to omit, where appropriate, the procedure for achieving synchronization between each of the plurality of radio base stations and a radio terminal.

First Embodiment (Mobile Communication System)

Hereinafter, a mobile communication system according to a first embodiment will be described. FIG. 1 is a diagram illustrating a mobile communication system 100 according to the first embodiment.

As illustrated in FIG. 1, the mobile communication system 100 includes a radio terminal 10 (hereinafter, referred to as UE 10) and a core network 50. Furthermore, the mobile communication system 100 includes a first communication system and a second communication system.

The first communication system, for example, is a communication system corresponding to LTE (Long Term Evolution). The first communication system, for example, includes a base station 110A (hereinafter, referred to as MeNB 110A), a home base station 110B (hereinafter, referred to as HeNB 110B), a home base station gateway 120B (hereinafter, referred to as HeNB-GW 120B), and MME 130.

In addition, a radio access network (E-UTRAN; Evolved Universal Terrestrial Radio Access Network) corresponding to the first communication system is configured by the MeNB 110A, the HeNB 110B, and the HeNB-GW 120B.

The second communication system, for example, is a communication system corresponding to UMTS (Universal Mobile Telecommunication System). The second communication system, includes a base station 210A (hereinafter, referred to as MNB 210A), a home base station 210B (hereinafter, referred to as HNB 210B), RNC 220A, a home base station gateway 220B (hereinafter, referred to as HNB-GW 220B), and SGSN 230.

In addition, a radio access network (UTRAN; Universal Terrestrial Radio Access Network) corresponding to the second communication system is configured by the MNB 210A, the HNB 210B, the RNC 220A, and the HNB-GW 220B.

The UE 10 is a device (User Equipment) configured to communicate with the second communication system or the first communication system. For example, the UE 10 has a function of performing radio communication with the MeNB 110A and the HeNB 110B. Alternatively, the UE 10 has a function of performing radio communication with the MNB 210A and the HNB 210B.

The MeNB 110A, which manages a general cell 111A, is a device (evolved NodeB) that performs radio communication with the UE 10 being present in the general cell 111A.

The HeNB 110B, which manages a specific cell 111B, is a device (Home evolved NodeB) that performs radio communication with the UE 10 being present in the specific cell 111B.

The HeNB-GW 120B, which is connected to the HeNB 110B, is a device (Home evolved NodeB Gateway) that manages the HeNB 110B.

The MME 130, which is connected to the MeNB 110A, is a device (Mobility Management Entity) that manages the mobility of the UE 10 having set up of a radio connection with the MeNB 110A. Furthermore, the MME 130, which is connected to the HeNB 110B via the HeNB-GW 120B, is a device that manages the mobility of the UE 10 having set up of a radio connection with the HeNB 110B.

The MNB 210A, which manages a general cell 211A, is a device (NodeB) that performs radio communication with the UE 10 being present in the general cell 211A.

The HNB 210B, which manages a specific cell 211B, is a device (Home NodeB) that performs radio communication with the UE 10 being present in the specific cell 211B.

The RNC 220A, which is connected to the MNB 210A, is a device (Radio Network Controller) that sets up a radio connection (RRC connection) with the UE 10 being present in the general cell 211A.

The HNB-GW 220B, which is connected to the HNB 210B, is a device (Home NodeB Gateway) that sets up a radio connection (RRC Connection) with the UE 10 being present in the specific cell 211B.

The SGSN 230 is a device (Serving GPRS Support Node) that performs packet switching in a packet switching domain. The SGSN 230 is provided in the core network 50. Although not illustrated in FIG. 1, a device (MSC; Mobile Switching Center) that performs circuit switching in a circuit switching domain may be provided in the core network 50.

In addition, it is noted that the general cell and the specific cell are understood as a function of performing radio communication with the UE 10. However, the general cell and the specific cell are also used as a term indicating a coverage area of a cell. Furthermore, cells such as general cells and specific cells are identified by frequencies, spreading codes, time slots and the like used in the cells.

Here, a coverage area of the general cell is wider than a coverage area of the specific cell. The general cell, for example, is a macro cell provided by a communication provider. The specific cell, for example, is a femto cell or a home cell provided by the third party other than the communication provider. The specific cell may be a CSG (Closed Subscriber Group) cell or a pico cell provided by the communication provider.

Hereinafter, the first communication system will be mainly described. The following description may also be applied to the second communication system.

In the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Furthermore, in the first communication system, as an uplink channel, an uplink control channel (PUCCH; Physical Uplink Control Channel), an uplink shared channel (PUSCH; Physical Uplink Shared Channel) and the like exist. Furthermore, as a downlink channel, a downlink control channel (PDCCH; Physical Downlink Control Channel), a downlink shared channel (PDSCH; Physical Downlink Shared Channel) and the like exist.

The uplink control channel is a channel that carries a control signal. The control signal, for example, includes CQI (Channel Quality Indicator), PMI (Precoding Matrix Indicator), RI (Rank Indicator), SR (Scheduling Request), and ACK/NACK.

The CQI is a signal that notifies a recommended modulation scheme and an encoding rate to be used in downlink transmission. The PMI is a signal that indicates a precoder matrix preferably used for the downlink transmission. The RI is a signal that indicates the number of layers (the number of streams) to be used in the downlink transmission. The SR is a signal that requests the assignment of an uplink radio resource (a resource block which will be described later). The ACK/NACK is a signal that indicates whether it is possible to receive a signal that is transmitted through a downlink channel (for example, PDSCH).

The uplink shared channel is a channel that carries a control signal (including the aforementioned control signal) and/or a data signal. For example, the uplink radio resource may be assigned only to the data signal, or may be assigned such that the data signal and the control signal are multiplexed.

The downlink control channel is a channel that carries a control signal. The control signal, for example, includes Uplink SI (Scheduling Information), Downlink SI (Scheduling Information), and a TPC bit.

The Uplink SI is a signal that indicates the assignment of the uplink radio resource. The Downlink SI is a signal that indicates the assignment of a downlink radio resource. The TPC bit is a signal that indicates increase and decrease in power of a signal that is transmitted through the uplink channel.

The downlink shared channel is a channel that carries a control signal and/or a data signal. For example, the downlink radio resource may be assigned only to the data signal, or may be assigned such that the data signal and the control signal are multiplexed.

In addition, a control signal transmitted through the downlink shared channel includes TA (Timing Advance). The TA is transmission timing correction information between the UE 10 and the MeNB 110A, and is measured by the MeNB 110A on the basis of an uplink signal transmitted from the UE 10.

Furthermore, a control signal that is transmitted through a channel other than the downlink control channel (PDCCH) and the downlink shared channel (PDSCH) includes the ACK/NACK. The ACK/NACK is a signal that indicates whether it is possible to receive a signal that is transmitted through an uplink channel (for example, PUSCH).

In addition, the general cell and the specific cell broadcast broadcast information through a broadcast channel (BCCH; Broadcast Control Channel). The broadcast information, for example, is information such as MIB (Master Information Block) or SIB (System Information Block).

(Radio Frame)

Figure 2:
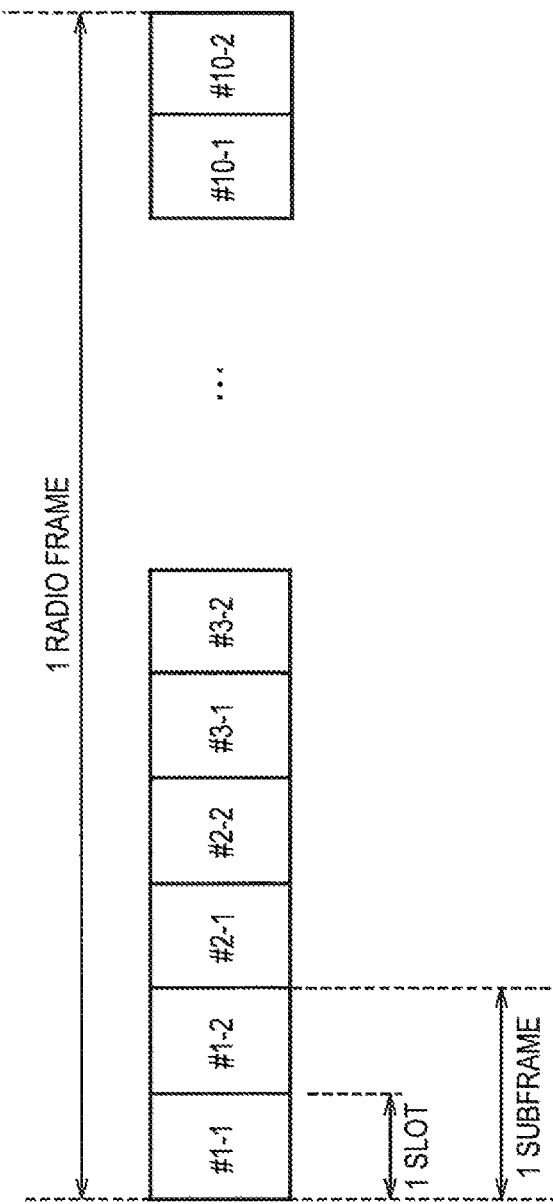
FIG. 2 is a diagram illustrating the radio frame in the first communication system.

Hereinafter, a radio frame in the first communication system will be described. FIG. 2 is a diagram illustrating the radio frame in the first communication system.

As illustrated in FIG. 2, one radio frame is configured by 10 subframes and one subframe is configured by two slots. One slot has a time length of 0.5 msec, one subframe has a time length of 1 msec, and one radio frame has a time length of 10 msec.

In addition, one slot is configured by a plurality of OFDM symbols (for example, six OFDM symbols or seven OFDM symbols) in a downlink. Similarly, one slot is configured by a plurality of SC-FDMA symbols (for example, six SC-FDMA symbols or seven SC-FDMA symbols) in an uplink.

(Radio Resource)

Figure 3:
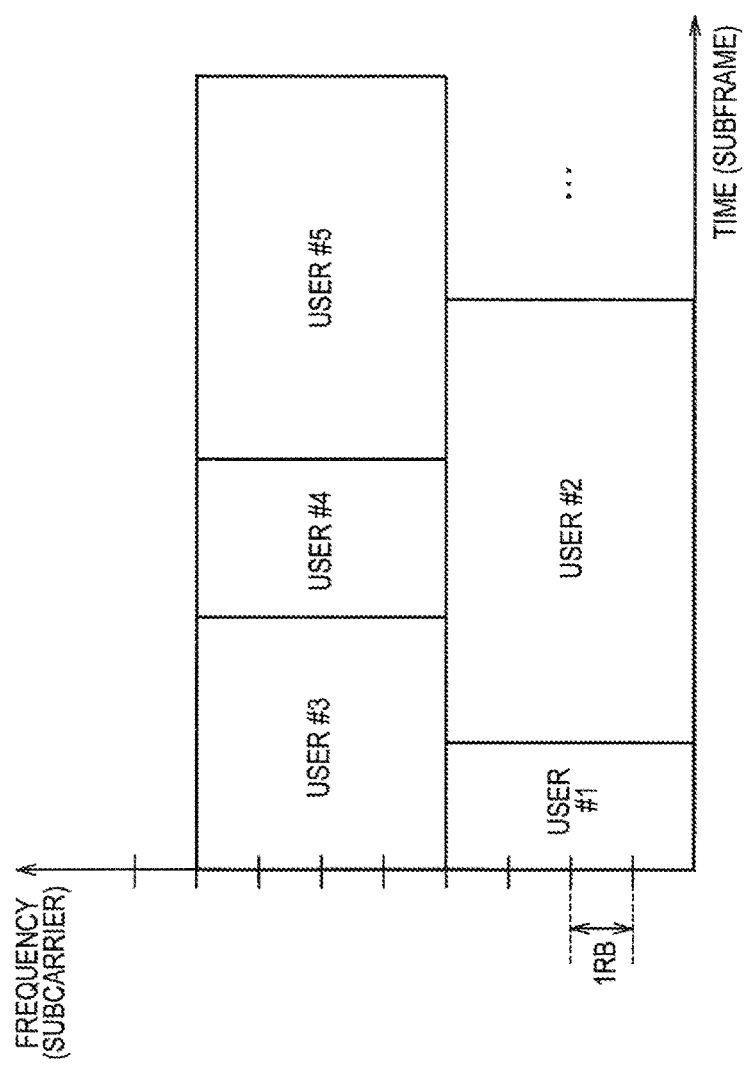
FIG. 3 is a diagram illustrating the radio resource in the first communication system.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency is configured by a plurality of subcarriers, and a predetermined number of subcarriers (12 subcarriers) are collectively called a resource block (RB). A time has a unit, such as the OFDM symbol (or the SC-FDMA symbol), the slot, the subframe, or the radio frame, as described above.

Here, the radio resource is assignable to each one resource block. Furthermore, on the frequency axis and the time axis, it is possible to divide the radio resources to assign the same to a plurality of users (for example, user #1 to user #5).

Furthermore, the radio resource is assigned by the MeNB 110A. The MeNB 110A assigns the radio resources to each UE 10 on the basis of the CQI, the PMI, the RI and the like.

(Application Scene)

Figure 4:
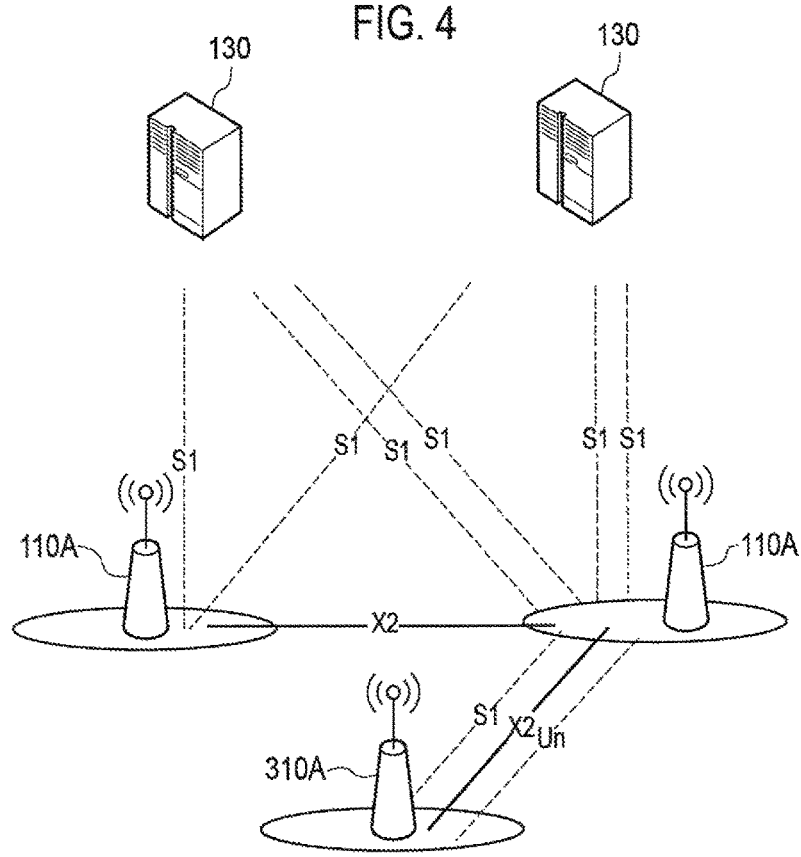
FIG. 4 is a diagram for explaining the application scene according to the first embodiment.

Hereinafter, an application scene according to the first embodiment will be described. FIG. 4 is a diagram for explaining the application scene according to the first embodiment. FIG. 4 illustrates the MeNB 110A and a relay node 310A as an example of a radio base station. The relay node 310A is connected to the MeNB 110A and has a function of the radio base station. However, the radio base station may be the MNB 210A or the HNB 210B.

As illustrated in FIG. 4, each radio base station is connected to each other through a backhaul network. Furthermore, an interface between the MeNB 110A and an upper node (here, the MME 130) is called an S1 interface. An interface for directly connecting a plurality of MeNBs 110A to one another is called an X2 interface. An interface for connecting the MeNB 110A to the relay node 310A is called a Un interface. Furthermore, the S1 interface, the X2 interface, and the Un interface are generically called the backhaul network.

In such a case, a plurality of radio base stations cooperatively perform a process with each other. As the process cooperatively performed by the plurality of radio base stations, a handover, a cooperative reception process, a cooperative transmission process and the like are considered. The cooperative reception process and the cooperative transmission process are called CoMP (Coordinated Multi-Point Operation) and the like.

In the first embodiment, each of the plurality of radio base stations notifies another radio base station of synchronization information for designating a synchronization state between the radio base station and the UE 10, through the backhaul network.

In the first embodiment, the synchronization information includes "Sync Method", "Sub-frame Time Offset", "Sub-frame No. Offset", and "Timing Advance Offset". Details of the synchronization information will be described later (refer to FIG. 6).

(Radio Base Station)

Figure 5:
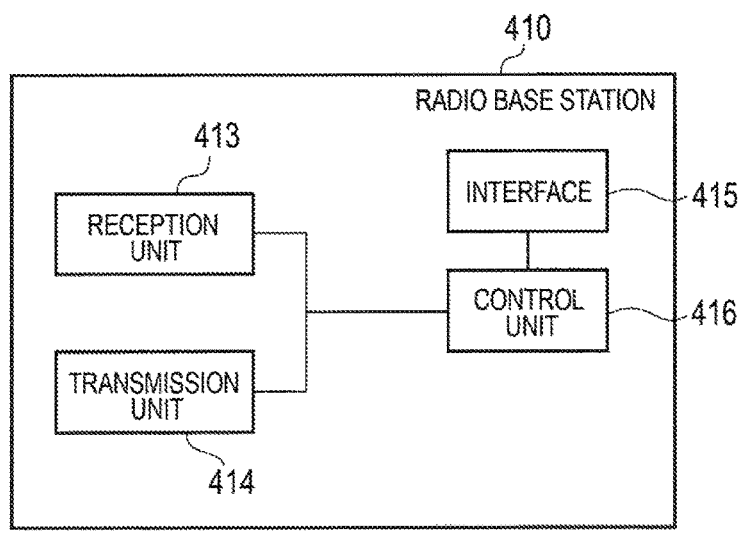
FIG. 5 is a block diagram illustrating the radio base station 410 according to the first embodiment.

Hereinafter, a radio base station according to the first embodiment will be described. FIG. 5 is a block diagram illustrating the radio base station 410 according to the first embodiment. The radio base station 410 may be the MeNB 110A or the HeNB 110B. Alternatively, the radio base station 410 may be the relay node 310A. Alternatively, the radio base station 410 may be the MNB 210A or the HNB 210B.

As illustrated in FIG. 5, the radio base station 410 includes a reception unit 413, a transmission unit 414, an interface 415, and a control unit 416.

The reception unit 413 receives an uplink signal from the UE 10 connected to a cell managed by the radio base station 410. The reception unit 413, for example, receives the uplink signal through the uplink shared channel (PUSCH).

The transmission unit 414 transmits a downlink signal to the UE 10 connected to the cell managed by the radio base station 410. The transmission unit 414, for example, transmits a radio resource (scheduling information) assigned by the radio base station 410.

The interface 415 is an interface used for performing communication with another radio base station through the backhaul network. The interface 415 is an X2 interface for directly connecting radio base stations to each other. Alternatively, the interface 415 is an S1 interface for connecting the radio base stations to each other through an upper node (for example, the MME 130).

In the first embodiment, the interface 415 constitutes a notification unit that notifies another radio base station of synchronization information for designating a synchronization state between the radio base station and the UE 10, through the backhaul network.

When synchronization information shared among the plurality of radio base stations was updated, the interface 415 may notify another radio base station of the synchronization information. Alternatively, the interface 415 may notify another radio base station of the synchronization information at a predetermined cycle.

In the first embodiment, as illustrated in FIG. 6, the synchronization information includes "Sync Method", "Sub-frame Time Offset", "Sub-frame No. Offset", and "Timing Advance Offset".

The "Sync Method" is a value indicating a procedure for achieving synchronization between the radio base station and the UE 10. For example, the "Sync Method" indicates a type of a synchronization method of an absolute time common in the plurality of radio base stations. As such a synchronization method, a method of using GPS, a method of using IEEE 1588, and the like are considered.

The "Sub-frame Time Offset" is a correction value of a reference point (hereinafter, referred to as an absolute time reference point) on an absolute time axis common in the plurality of radio base stations and a reference point (hereinafter, referred to as a subframe reference point) on a unique time axis unique to the radio base station 410. The "Sub-frame Time Offset", for example, indicates a difference (a relative value) between the absolute reference point "0" and the subframe reference point "0", and is a value that is set in units of micro seconds.

The "Sub-frame No. Offset" is a correction value of the reference point (the absolute time reference point) on the absolute time axis common in the plurality of radio base stations and a reference point (a subframe number reference point) on the unique time axis unique to the radio base station 410. The "Sub-frame Time Offset", for example, indicates a difference (a relative value) between the absolute reference point "0" and the subframe number reference point "0", and is a value that is set in units of micro seconds.

The "Timing Advance Offset" is information (TA; Timing Advance) indicating a difference between a timing at which the UE 10 transmits an uplink signal and a timing at which the radio base station 410 receives the uplink signal. The "Timing Advance Offset", for example, is a value that is set in units of micro seconds.

The control unit 416 controls the operation of the radio base station 410. The control unit 416, for example, determines whether it is possible to omit a procedure for achieving synchronization between each of the plurality of radio base stations and the UE 10.

In the first embodiment, the control unit 416 determines the degree of a synchronization difference for the UE 10 between the radio base station 410 (a home station) and another radio base station on the basis of synchronization information notified from the other radio base station.

For example, the control unit 416 determines whether a difference (hereinafter, referred to as a downlink subframe number difference) between the "Sub-frame No. Offset" of the radio base station 410 (the home station) and the "Sub-frame No. Offset" of the other radio base station exceeds a threshold value Tdsn. The threshold value Tdsn is a threshold value allowable for the downlink subframe number difference.

Alternatively, the control unit 416 determines whether a difference (hereinafter, referred to as a downlink subframe time difference) between the "Sub-frame Time Offset" of the radio base station 410 (the home station) and the "Sub-frame Time Offset" of the other radio base station exceeds a threshold value Tdst. The threshold value Tdst is a threshold value allowable for the downlink subframe time difference.

Alternatively, the control unit 416 determines whether a difference (an uplink timing difference) between the "Timing Advance Offset" of the radio base station 410 (the home station) and the "Timing Advance Offset" of the other radio base station exceeds a threshold value Tut. The threshold value Tut is a threshold value allowable for the uplink timing difference.

Specifically, when the downlink subframe number difference exceeds the threshold value Tdsn, the control unit 416 determines that it is necessary to normally perform the procedure for achieving synchronization between the radio base station and the UE 10 (a normal control mode).

When the downlink subframe number difference is smaller than the threshold value Tdsn and the downlink subframe time difference exceeds the threshold value Tdst, the control unit 416 determines that it is possible to omit a subframe synchronization procedure from the procedure for achieving the synchronization between the radio base station and the UE 10 (a control mode A). In the control mode A, for example, in a handover procedure from a radio base station (a source radio base station) synchronized with the UE 10 to a radio base station (a target radio base station) not synchronized with the UE 10, a subframe synchronization procedure (a synchronization procedure using a Primary-Synchronization Signal or a Secondary-Synchronization Signal) between the target radio base station and the UE 10 is omitted. Alternatively, in the control mode A, for example, in a cooperative transmission process (transmission CoMP), a subframe synchronization procedure for performing DPS (Dynamic Point selection), CS/CB (Coordinated Scheduling/Coordinated Beamforming) is omitted.

When the downlink subframe number difference is smaller than the threshold value Tdsn and the downlink subframe time difference is smaller than the threshold value Tdst, the control unit 416 determines that it is possible to omit a symbol synchronization procedure from the procedure for achieving the synchronization between the radio base station and the UE 10 (a control mode B). In the control mode B, for example, in the handover procedure from the radio base station (the source radio base station) synchronized with the UE 10 to the radio base station (the target radio base station) not synchronized with the UE 10, a symbol synchronization procedure (a synchronization procedure using a Reference Signal) between the target radio base station and the UE 10 is omitted. Alternatively, in the control mode B, in the cooperative transmission process (transmission CoMP), a symbol synchronization procedure for performing JT (Joint Transmission) is omitted.

When the uplink timing difference is smaller than the threshold value Tut, the control unit 416 determines that it is possible to omit an uplink synchronization procedure from the procedure for achieving the synchronization between the radio base station and the UE 10 (a control mode C). In the control mode C, for example, in the handover procedure from the radio base station (the source radio base station) synchronized with the UE 10 to the radio base station (the target radio base station) not synchronized with the UE 10, an uplink synchronization procedure (a TA setup procedure using PRACH) between the target radio base station and the UE 10 is omitted. Alternatively, in the control mode C, for example, in a cooperative reception process (reception CoMP), an uplink synchronization procedure for performing a cooperative multipoint reception is omitted.

(Operation of Mobile Communication System)

Hereinafter, the operation of the mobile communication system according to the first embodiment will be described.

FIG. 7 to FIG. 11 are diagrams illustrating the operation of the mobile communication system 100 according to the first embodiment.

Firstly, calculation of the downlink subframe number difference will be described with reference to FIG. 7.

As illustrated in FIG. 7, in step 11, the radio base station 410 reads synchronization information (here, "Sub-frame No. Offset" and "Sync Method") of the radio base station 410 (a home station).

In step 12, the radio base station 410 reads synchronization information (here, "Sub-frame No. Offset" and "Sync Method") of another radio base station.

In step 13, the radio base station 410 compares the "Sync Method" of the radio base station 410 (the home station) with the "Sync Method" of the other radio base station, thereby calculating a difference of a reference point on an absolute time axis.

In step 14, the radio base station 410 corrects the "Sub-frame No. Offset" of the radio base station 410 (the home station) and the "Sub-frame No. Offset" of the other radio base station using the difference of the reference point on the absolute time axis, and compares the corrected values with each other, thereby calculating the downlink subframe number difference.

Secondly, calculation of the downlink subframe time difference will be described with reference to FIG. 8.

As illustrated in FIG. 8, in step 21, the radio base station 410 determines whether the calculation of the downlink subframe number difference was completed. When a result of the determination is "YES", the radio base station 410 proceeds to a process of step 22. Meanwhile, when the result of the determination is "NO", the radio base station 410 completes a series of processes.

In step 22, the radio base station 410 reads the downlink subframe number difference.

In step 23, the radio base station 410 reads synchronization information (here, "Sub-frame Time Offset") of the radio base station 410 (the home station).

In step 24, the radio base station 410 reads synchronization information (here, "Sub-frame Time Offset") of another radio base station.

In step 25, the radio base station 410 corrects the "Sub-frame Time Offset" of the radio base station 410 (the home station) and the "Sub-frame Time Offset" of the other radio base station using the difference of the reference point on the absolute time axis calculated in the step 13, and compares the corrected values with each other, thereby calculating the downlink subframe time difference.

Thirdly, calculation of the uplink timing difference will be described with reference to FIG. 9.

Figure 9:
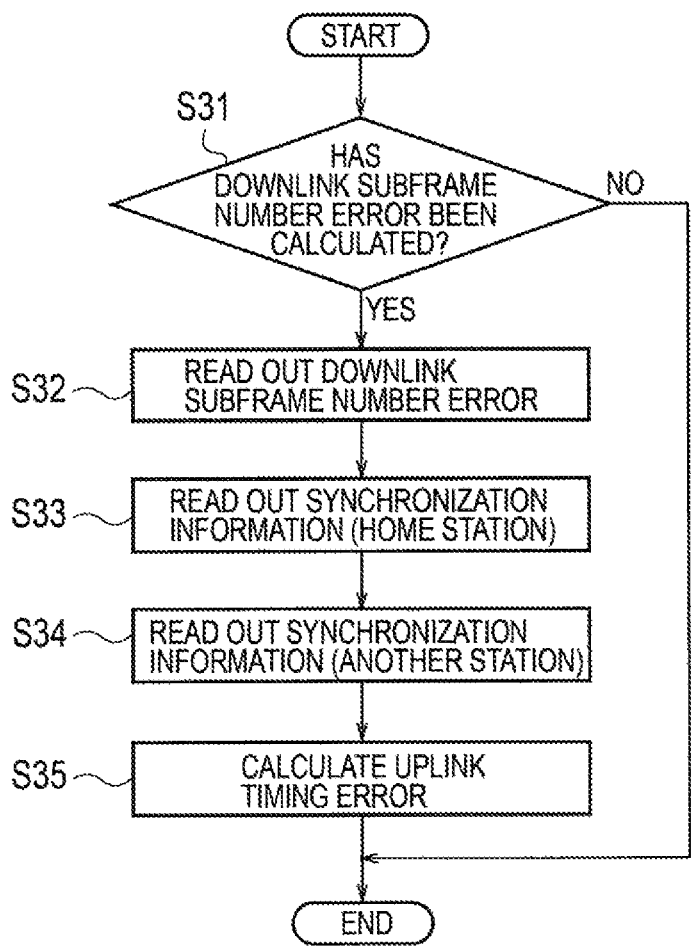
FIG. 9 is a flow diagram illustrating the operation of the mobile communication system 100 according to the first embodiment.

As illustrated in FIG. 9, in step 31, the radio base station 410 determines whether the calculation of the downlink subframe number difference was completed. When a result of the determination is "YES", the radio base station 410 proceeds to a process of step 32. Meanwhile, when the result of the determination is "NO", the radio base station 410 completes a series of processes.

In step 32, the radio base station 410 reads the downlink subframe number difference.

In step 33, the radio base station 410 reads synchronization information (here, "Timing Advance Offset") of the radio base station 410 (the home station).

In step 34, the radio base station 410 reads synchronization information (here, "Timing Advance Offset") of another radio base station.

In step 35, the radio base station 410 corrects the "Timing Advance Offset" of the radio base station 410 (the home station) and the "Timing Advance Offset" of the other radio base station using the difference of the reference point on the absolute time axis calculated in the step 13, and compares the corrected values with each other, thereby calculating the uplink timing difference.

Figure 10:
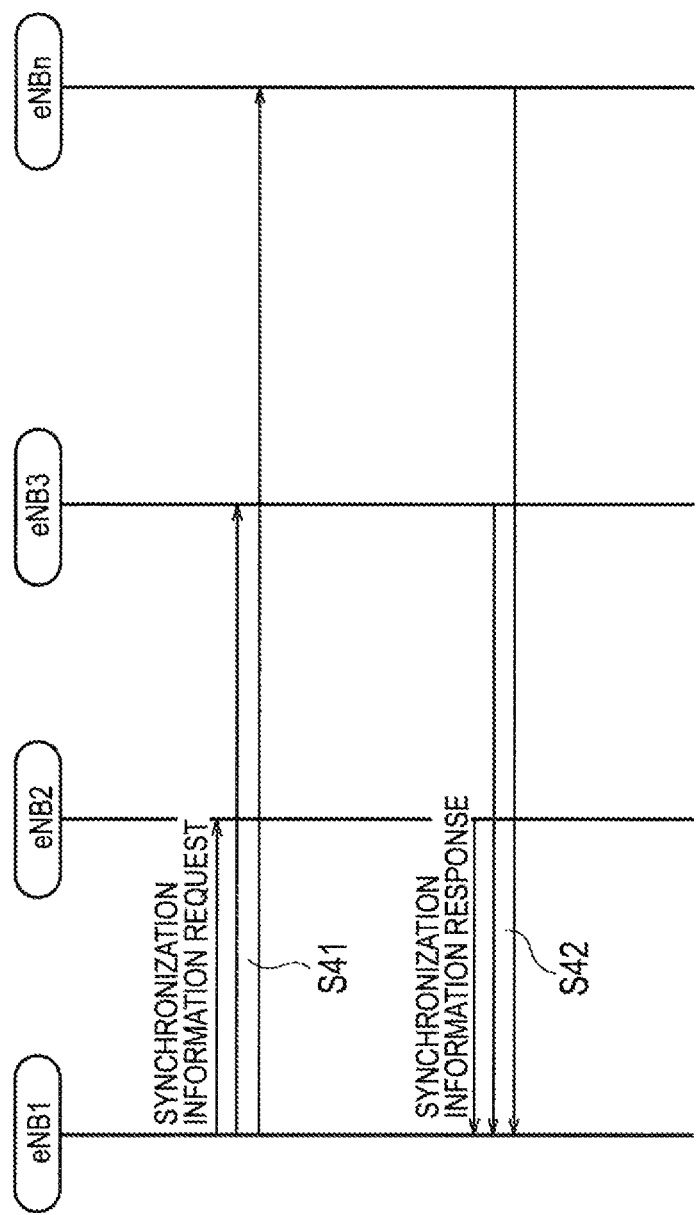
FIG. 10 is a sequence diagram illustrating the operation of the mobile communication system 100 according to the first embodiment.

Fourthly, notification of the synchronization information will be described with reference to FIG. 10. FIG. 10 illustrates a case in which eNB1 to eNBn are provided as radio base stations and the eNB1 acquires the synchronization information.

As illustrated in FIG. 10, in step 41, the eNB1 transmits a signal (a synchronization information request) for requesting notification of the synchronization information, to the eNB2 to the eNBn. In step 42, the eNB2 to eNBn notify the eNB1 of the synchronization information.

Here, as described above, the synchronization information, for example, is the "Sync Method", the "Sub-frame Time Offset", the "Sub-frame No. Offset", and the "Timing Advance Offset".

Fifthly, selection of a control mode using the synchronization information will be described with reference to FIG. 11.

Figure 11:
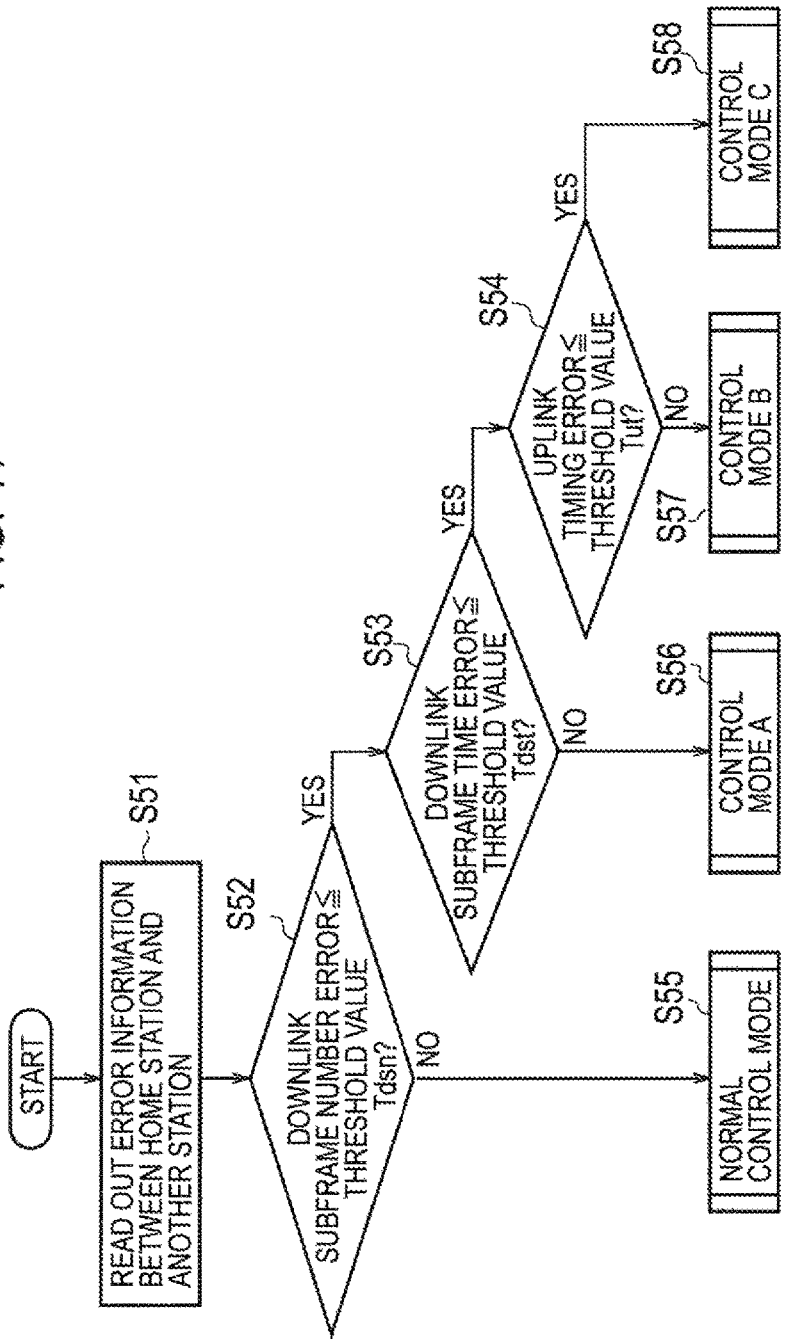
FIG. 11 is a flow diagram illustrating the operation of the mobile communication system 100 according to the first embodiment.

As illustrated in FIG. 11, in step 51, the radio base station 410 reads difference information between the radio base station 410 (the home station) and another radio base station. The difference information includes the downlink subframe number difference, the downlink subframe time difference, and the uplink timing difference.

In step 52, the radio base station 410 determines whether the downlink subframe number difference is equal to or less than the threshold value Tdsn. When the downlink subframe number difference exceeds the threshold value Tdsn, that is, when a result of the determination is "NO", the radio base station 410 proceeds to a process of step 55. Meanwhile, when the downlink subframe number difference is equal to or less than the threshold value Tdsn, that is, when the result of the determination is "YES", the radio base station 410 proceeds to a process of step 53.

In step 53, the radio base station 410 determines whether the downlink subframe time difference is equal to or less than the threshold value Tdst. When the downlink subframe time difference exceeds the threshold value Tdst, that is, when a result of the determination is "NO", the radio base station 410 proceeds to a process of step 56. Meanwhile, when the downlink subframe time difference is equal to or less than the threshold value Tdst, that is, when the result of the determination is "YES", the radio base station 410 proceeds to a process of step 54.

In step 54, the radio base station 410 determines whether the uplink timing difference is equal to or less than the threshold value Tut. When the uplink timing difference exceeds the threshold value Tut, that is, when a result of the determination is "NO", the radio base station 410 proceeds to a process of step 57. Meanwhile, when the uplink timing difference is equal to or less than the threshold value Tut, that is, when the result of the determination is "YES", the radio base station 410 proceeds to a process of step 58.

In step 55, since the downlink subframe number difference exceeds the threshold value Tdsn, the radio base station 410 determines that it is necessary to normally perform the procedure for achieving the synchronization between the radio base station and the UE 10 (the normal control mode).

In step 56, since the downlink subframe number difference is smaller than the threshold value Tdsn and the downlink subframe time difference exceeds the threshold value Tdst, the radio base station 410 performs the control mode A. In the control mode A, for example, in the handover procedure, the subframe synchronization procedure (the synchronization procedure using the Primary-Synchronization Signal or the Secondary-Synchronization Signal) between the target radio base station and the UE 10 is omitted. Alternatively, in the control mode A, for example, in a cooperative transmission process (transmission CoMP), a subframe synchronization procedure for performing DPS (Dynamic Point selection), CS/CB (Coordinated Scheduling/Coordinated Beamforming) is omitted.

In step 57, since the downlink subframe number difference is smaller than the threshold value Tdsn and the downlink subframe time difference is smaller than the threshold value Tdst, the radio base station 410 performs the control mode B. In the control mode B, for example, in the handover procedure, the symbol synchronization procedure (the synchronization procedure using the Reference Signal) between the target radio base station and the UE 10 is omitted. Alternatively, in the control mode B, in the cooperative transmission process (transmission CoMP), a symbol synchronization procedure for performing JT (Joint Transmission) is omitted.

In step 58, since the uplink timing difference is smaller than the threshold value Tut, the radio base station 410 performs the control mode C. In the control mode C, for example, in the handover procedure, the uplink synchronization procedure (the TA setup procedure using PRACH) between the target radio base station and the UE 10 is omitted. Alternatively, in the control mode C, for example, in a cooperative reception process (reception CoMP), an uplink synchronization procedure for performing a cooperative multipoint reception is omitted.

In FIG. 11, the determination was made in the sequence of the step 52 and step 53. However, the embodiment is not limited thereto. Specifically, whether to omit the uplink synchronization procedure may be determined independently of whether to omit a downlink synchronization procedure.

(Operation and Effect)

In the first embodiment, the plurality of radio base stations share the synchronization information by notifying one another of the synchronization information through the backhaul network. Consequently, it is possible to omit, where appropriate, the procedure for achieving synchronization between each of the plurality of radio base stations and a radio terminal.

[First Modification]

Hereinafter, a first modification of the first embodiment will be explained. Mainly the differences from the first embodiment will be described, below.

Specifically, in the first embodiment, the synchronization information includes the "Sync Method", the "Sub-frame Time Offset", the "Sub-frame No. Offset", and the "Timing Advance Offset".

On the other hand, in the first modification, the synchronization information is "DL Timing Offset". The "DL Timing Offset" is information indicating a difference between timings at which the UE 10 receives downlink signals from a plurality of radio base stations (hereinafter, referred to as a downlink timing difference).

Specifically, a case in which the eNB1 and the eNB2 are provided as the plurality of radio base stations will be described with reference to FIG. 12.

Figure 12:
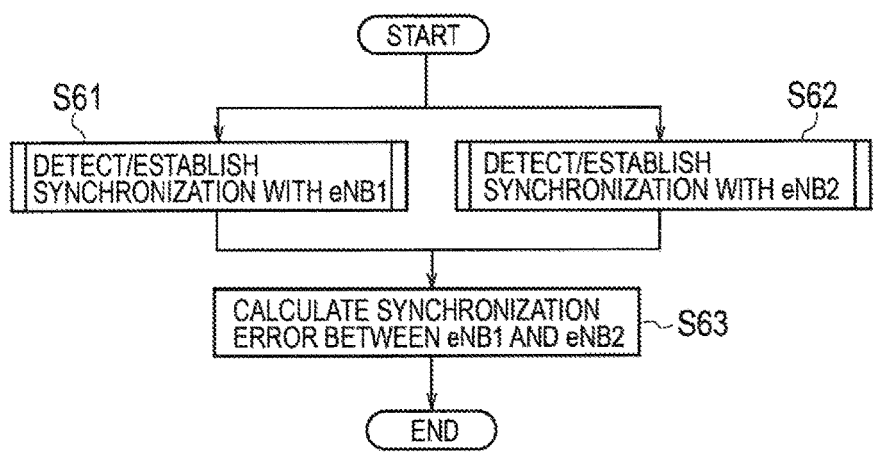
FIG. 12 is a flow diagram illustrating the operation of the mobile communication system 100 according to the first modification.

As illustrated in FIG. 12, in step 61, the UE 10 detects and establishes synchronization with the eNB1 on the basis of a synchronization signal and a reference signal, which are received from the eNB1. Similarly, in step 62, the UE 10 detects and establishes synchronization with the eNB2 on the basis of a synchronization signal and a reference signal, which are received from the eNB2. Next, in step 63, on the basis of a clock signal of the UE 10, the UE 10 calculates a difference between a timing at which the UE 10 receives a downlink signal from the eNB1 and a timing at which the UE 10 receives a downlink signal from the eNB2 (a downlink timing difference).

Here, the UE 10 reports the downlink timing difference to the eNB1 and the eNB2. For example, the UE 10 reports the downlink timing difference to the eNB1 and the eNB2 as the "DL Timing Offset" using a format illustrated in FIG. 13. For example, the UE 10 may include the "DL Timing Offset" in a message (a Measurement Report) for reporting received quality.

[Second Modification]

Hereinafter, a second modification of the first embodiment will be explained. Mainly the differences from the first embodiment will be described, below.

Specifically, in the first embodiment, the synchronization information includes the "Sync Method", the "Sub-frame Time Offset", the "Sub-frame No. Offset", and the "Timing Advance Offset".

On the other hand, in the second modification, the synchronization information includes the downlink timing difference, the uplink timing difference, and information indicating whether the CoMP is performed.

Specifically, in the second modification, mainly a handover procedure from a radio base station (hereinafter, referred to as a first radio base station or a source radio base station) synchronized with the UE 10 to a radio base station (hereinafter, referred to as a second radio base station or a target radio base station) not synchronized with the UE 10 is described, below.

The downlink timing difference is a difference between a timing at which the UE 10 receives a downlink signal transmitted from the first radio base station and a timing at which the UE 10 receives a downlink signal transmitted from the second radio base station. The downlink timing difference, for example, is acquirable by the procedure disclosed in the first modification.

The uplink timing difference is a difference between a timing at which the first radio base station receives an uplink signal transmitted from the UE 10 and a timing at which the second radio base station receives the uplink signal transmitted from the UE 10. The uplink timing difference, for example, is acquirable by the procedure described in the first embodiment.

The information indicating whether the CoMP is performed is information indicating whether the first radio base station and the second radio base station perform the cooperative transmission process or the cooperative reception process.

In the second modification, when the downlink timing difference is within an allowable range and the uplink timing difference is within the allowable range, the first radio base station omits a synchronization process between the UE 10 and the second radio base station in the handover procedure. Specifically, the first radio base station transmits an identifier to the UE 10, wherein the identifier indicates that it is necessary to omit the synchronization process between the UE 10 and the second radio base station. The identifier, for example, is preferably included in a handover command that is transmitted from the first radio base station to the UE 10.

When the first radio base station and the second radio base station perform the cooperative transmission process and the cooperative reception process, the first radio base station omits the synchronization process between the UE 10 and the second radio base station and also permits a soft handover in the handover procedure. Specifically, the first radio base station transmits an identifier to the UE 10, wherein the identifier indicates that the synchronization process between the UE 10 and the second radio base station is omitted and the soft handover is permitted. The identifier, for example, is preferably included in a handover command that is transmitted from the first radio base station to the UE 10.

In addition, the soft handover using the cooperative transmission process and the cooperative reception process is called CoMP soft handover for distinction from the conventional soft handover. It should be noted that specifically, when the radio base station is asynchronous, it is not possible to perform the conventional soft handover.

(Operation of Mobile Communication System)

Figure 14:
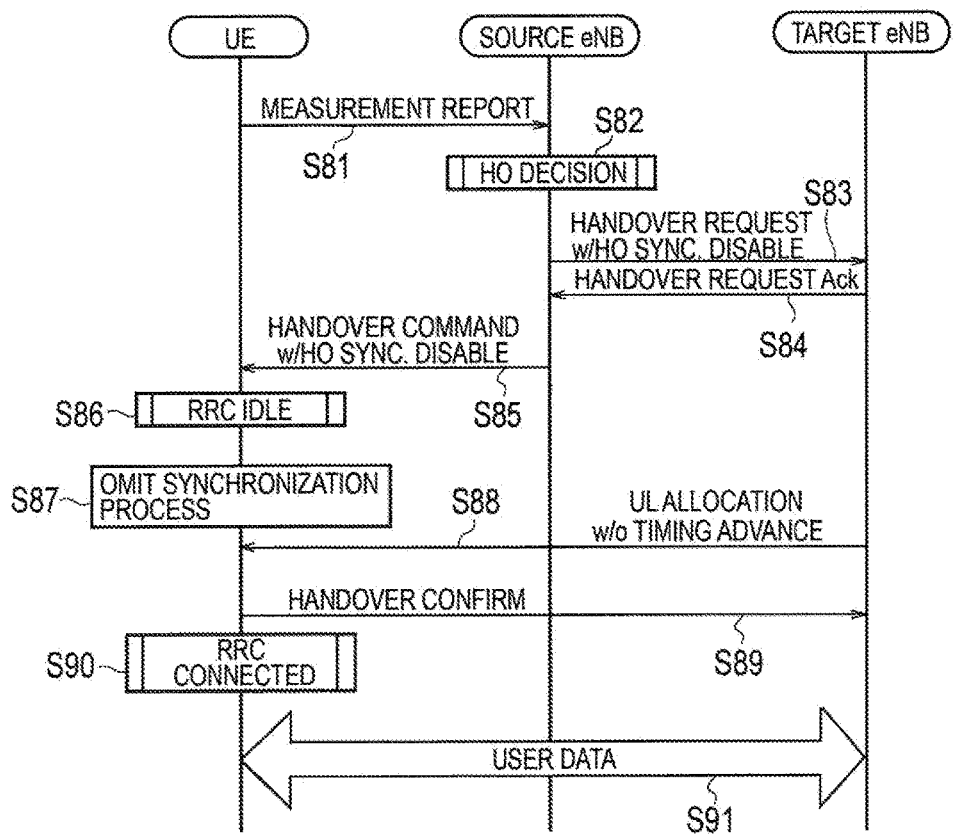
FIG. 14 is a sequence diagram illustrating the operation of the mobile communication system 100 according to the second modification.
Figure 15:
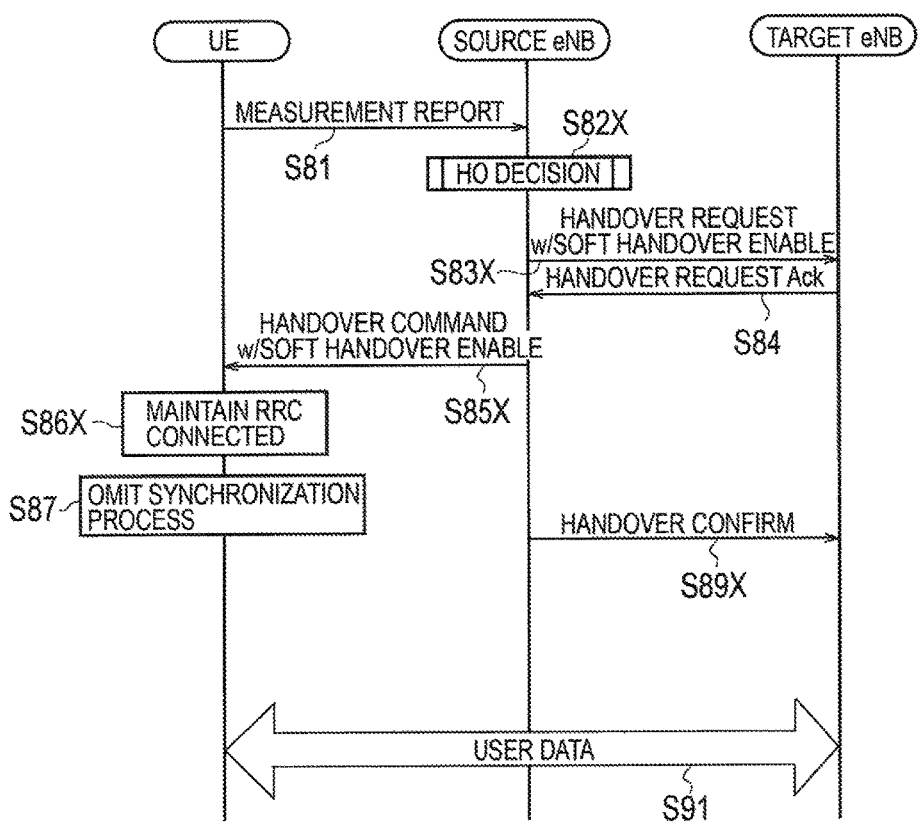
FIG. 15 is a sequence diagram illustrating the operation of the mobile communication system 100 according to the second modification.

Hereinafter, the operation of a mobile communication system according to the second modification will be described. FIG. 14 and FIG. 15 are diagrams illustrating the operation of the mobile communication system 100 according to the second modification.

Firstly, a procedure for omitting the synchronization process between the UE 10 and the second radio base station will be described with reference to FIG. 14.

As illustrated in FIG. 14, in step 81, the UE 10 transmits a message (a Measurement Report) for reporting received quality to the first radio base station (Source eNB).

In step 82, the first radio base station (Source eNB) determines whether to perform a handover. Furthermore, when the downlink timing difference is within an allowable range and the uplink timing difference is within the allowable range, the first radio base station (Source eNB) determines to omit the synchronization process between the UE 10 and the second radio base station in the handover procedure.

Hereinafter, a description will be continued on the assumption that the first radio base station (Source eNB) determines to perform the handover and omit the synchronization process.

In step 83, the first radio base station (Source eNB) transmits a handover request and also an identifier ("HO Synchronization Disable" illustrated in FIG. 16) to the second radio base station (Target eNB), wherein the identifier indicates that it is necessary to omit the synchronization process between the UE 10 and the second radio base station.

In step 84, the second radio base station (Target eNB) transmits a handover request response to the first radio base station (Source eNB).

In step 85, the first radio base station (Source eNB) transmits a handover command and also the identifier ("HO Synchronization Disable" illustrated in FIG. 16) to the UE 10, wherein the identifier indicates that it is necessary to omit the synchronization process between the UE 10 and the second radio base station.

In step 86, the UE 10 is transitioned to an idle state from a connected state in which the UE 10 was connected to the first radio base station (Source eNB).

In step 87, the UE 10 omits the synchronization process between the second radio base station (Target eNB) and the UE 10.

In step 88, the second radio base station (Target eNB) transmits uplink assignment information (UL Allocation) and TA (Timing Advance). However, the second radio base station (Target eNB) may not transmit the TA to the UE 10.

In step 89, the UE 10 transmits a handover confirmation to the second radio base station (Target eNB).

In step 90, the UE 10 is transitioned to a connected state, in which the UE 10 is connected to the second radio base station (Target eNB), from the idle state.

In step 91, the UE 10 transmits user data to the second radio base station (Target eNB) and receives user data from the second radio base station (Target eNB).

Secondly, a procedure for omitting the synchronization process between the UE 10 and the second radio base station and permitting the CoMP soft handover will be described with reference to FIG. 15. In FIG. 15, the similar step numbers are used to designate the processes similar to those of FIG. 14. A description for the processes similar to those of FIG. 14 will be omitted.

As illustrated in FIG. 15, in step 82X, the first radio base station (Source eNB) determines whether to perform a handover. Furthermore, when the first radio base station (Source eNB) and the second radio base station perform the cooperative transmission process and the cooperative reception process, the first radio base station determines to omit the synchronization process between the UE 10 and the second radio base station in the handover procedure and to permit the CoMP soft handover.

Hereinafter, a description will be continued on the assumption that the first radio base station (Source eNB) determines to perform the handover, and also determines to omit the synchronization process and permit the CoMP soft handover.

In step 83X, the first radio base station (Source eNB) transmits a handover request and an identifier ("Soft Handover Enable" illustrated in FIG. 16) to the second radio base station (Target eNB), wherein the identifier indicates that it is necessary to omit the synchronization process between the UE 10 and the second radio base station and to permit the CoMP soft handover.

In step 85X, the first radio base station (Source eNB) transmits a handover command and the identifier ("Soft Handover Enable" illustrated in FIG. 16) to the UE 10, wherein the identifier indicates that it is necessary to omit the synchronization process between the UE 10 and the second radio base station and to permit the CoMP soft handover.

In step 86X, the UE 10 maintains a connected state in which the UE 10 is connected to the first radio base station (Source eNB), without being transitioned to an idle state.

In step 89X, the first radio base station (Source eNB) transmits a handover confirmation to the second radio base station (Target eNB). In the example illustrated in FIG. 14, it is noted that the UE 10 transmits the handover confirmation. Furthermore, the UE 10 may transmit the handover confirmation to the second radio base station (Target eNB).

Particularly not mentioned in the above description, a threshold value, which indicates an allowable range for determining whether to omit the synchronization process, is transmitted from the second radio base station (Target eNB) to the first radio base station (Source eNB). Furthermore, policy, which indicates whether to permit the CoMP soft handover, is notified to the first radio base station (Source eNB) by the second radio base station (Target eNB).

For example, the threshold value, which indicates the allowable range for determining whether to omit the synchronization process, is notified to the first radio base station (Source eNB) by the second radio base station (Target eNB), in the format of "DL Timing Offset Threshold" and "UL Timing Offset Threshold" as illustrated in FIG. 17. Similarly, the policy, which indicates whether to permit the CoMP soft handover, is notified to the first radio base station (Source eNB) by the second radio base station (Target eNB), in the format of "CoMP HO Criterion" as illustrated in FIG. 17.

In the second modification, it is the first radio base station (Source eNB) that determines whether to omit the synchronization process. However, the embodiment is not limited thereto. Specifically, the UE 10 may determine whether to omit the synchronization process.

Similarly, in the second modification, it is the first radio base station (Source eNB) that determines whether to permit the CoMP soft handover. However, the embodiment is not limited thereto. Specifically, the UE 10 may to determine whether to permit the CoMP soft handover.

In such a case, the format illustrated in FIG. 17 is preferably notified to the UE 10 by the first radio base station (Source eNB).

Other Embodiments

The present invention has been described according to the embodiments described above. However, it should not be understood that the discussions and drawings constituting a part of this disclosure limit the present invention. From this disclosure, various alternative embodiments, examples and operational techniques will be apparent to those skilled in the art.

It is noted that the entire content of U.S. Provisional Application No. 61/612,546 (filed on Mar. 19, 2012) is incorporated in the present specification by reference.

INDUSTRIAL APPLICABILITY

As mentioned above, the mobile communication system, the radio base station, and the mobile communication method are beneficial in a mobile communication field because it is possible to omit, where appropriate, the procedure for achieving synchronization between each of the plurality of radio base stations and a radio terminal according to the mobile communication system, the radio base station, and the mobile communication method of the present invention.

What is claimed is:

1. A first radio base station, which communicates with a radio terminal, comprising:

a receiver configured to receive measurement result information from the radio terminal, wherein
the measurement result information indicates a timing difference between a timing at which the radio terminal receives a signal from the first radio base station and a timing at which the radio terminal receives a signal from a second radio base station, and
the timing difference is measured by the radio terminal when the radio terminal is connected to both the first and the second radio base stations and communicates bi-directionally with both the first and the second radio base stations, and a transmitter configured to transmit the measurement result information to the second radio base station, wherein
the measurement result information provides a basis on which the second radio base station controls data transmission to the radio terminal when the radio terminal is connected to both the first and the second radio base station and communicates bidirectionally with both the first and the second radio base station.

2. A mobile communication method, which is used in a mobile communication system including a first radio base station and a second radio base station communicating with a radio terminal, comprising:
- measuring, by the radio terminal, a timing difference between a timing at which the radio terminal receives a signal from the first radio base station and a timing at which the radio terminal receives a signal from the second radio base station, wherein the timing difference is measured by the radio terminal when the radio terminal is connected to both the first and the second radio base stations and communicates bi-directionally with both the first and the second radio base stations;
- transmitting, by the radio terminal, measurement result information indicating the timing difference, to the first radio base station;
- transmitting, by the first radio base station, the measurement result information to the second base station; and
- controlling, by the second base station based on the measurement result information, data transmission to the radio terminal when the radio terminal is connected to both the first and the second radio base station and communicates bidirectionally with both the first and the second radio base station.

3. A radio terminal, comprising:
- a controller configured to connect to both a first radio base station and a second radio base station and to communicate bi-directionally with both the first and the second radio base stations, wherein
- the controller is further configured to measure a timing difference between a timing at which the radio terminal receives a signal from the first radio base station and a timing at which the radio terminal receives a signal from the second radio base station,
- the radio terminal further comprises a transmitter configured to transmit a measurement result information indicating the timing difference, to the first radio base station, and
- the measurement result information provides a basis on which the second radio base station controls data transmission to the radio terminal when the radio terminal is connected to both the first and the second radio base station and communicates bidirectionally with both the first and the second radio base station.

* * * * *